Jan. 13, 1942.  A. RUEGGER  2,270,172
VEHICLE SEAT
Filed July 1, 1938

INVENTOR:
ANDRÉ RUEGGER
BY Maxwell E. Sparrow
ATTORNEY

Patented Jan. 13, 1942

2,270,172

UNITED STATES PATENT OFFICE 2,270,172

VEHICLE SEAT

André Ruegger, Levallois-Perret, France

Application July 1, 1938, Serial No. 216,897
In France July 5, 1937

3 Claims. (Cl. 155—116)

The present invention relates to tiltable seats for vehicles wherein an angular swinging movement is combined with rectilinear displacement.

The object of my invention is to provide a seat which is more comfortable than seats hitherto made without materially increasing the space occupied by said seat.

The comfort afforded by a seat depends upon various elements, such as the flexibility of the cushioning, the arrangement of the back, the width of the seat, and so on. When a seat is employed in vehicles for the transportation of passengers, such as railway vehicles and motor buses, physical fatigue modifies the sensation of comfort given by a seat and which can be restored only by varying the position of the passenger body. For instance, the vertical position of the back, as shown by Fig. 1 of the drawing, which is acceptable in the case of short travels, quickly grows disagreeable after a certain time. On the contrary, an inclined position such as that shown by Fig. 2 gives a sensation of comfort which relieves the fatigue caused by the vertical position.

It is therefore highly desirable to provide a seat capable of being swung into the inclined position of Fig. 2, but, it was hitherto generally impossible to employ a seat of this kind in vehicles for the transportation of passengers because the backward pivoting of the back of the seat was objectionable since, for instance in the case of railway vehicles, it would disturb the passengers standing behind the seat, or it would reduce to an excessive extent the number of places available in a vehicle in view of the considerable space occupied by the seat in its inclined position.

Therefore, one of the objects of the present invention is to obviate these drawbacks by providing a pivoting seat whcih does not occupy much more room in the inclined position than in the vertical position and the rear edge of which remains, in both of these positions, substantially in the same vertical plane, which represents, so to speak, the rear boundary of the space occupied by the seat, this boundary being for instance materialized by a partition or wall of a coach compartment or any other fixed part of a vehicle.

For this purpose in the tiltable seat according to the invention the rear part of the seat rests in the vertical and semi-recumbent positions on a link pivotally connected at its lower end to a base and at its upper end to said rear part, and an intermediate part of the seat slides in a guideway or on a guide member of said base which guide member is arranged higher than said pivoting connection on the base, the pivoting and sliding members co-operating so that in both positions of the seat the upper end of the back remains substantially on the same vertical line.

Other features of the present invention will appear from the following detailed description of some specific embodiments thereof.

Preferred embodiments of the present invention will be hereinafter described, with reference to the accompanying drawing, given merely by way of example, and in which.

In the embodiments shown in Figs. 3–6 the whole of the structure constituted by the seat proper S and the back D thereof is mounted upon a base or pedestal B. Base or pedestal B consists of a pair of substantially L-shaped standards between which seat S is mounted. Each standard comprises an upwardly extending panel part and a horizontally directed arm joined to the lower portion of each panel part. Both said panel parts and said arms may be interconnected through cross-members or traverses (not shown) to form a solid base frame for supporting the seat S proper. The supporting connection between the rear part of seat S and the aforesaid horizontal arm of pedestal B is constituted by a link or connecting rod L pivoted at one end to said rear part and at the other end to said horizontal arm of the pedestal B and further by pins or traverse bar E adapted to slide in a slot or guide F, for instance provided in the pedestal B. Base or pedestal B may be fixed to a suitable floor in any convenient manner.

Figure 1:
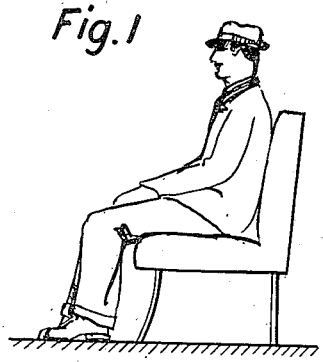
Figs. 1 and 2 are diagrammatic explanatory views.
Figure 3:
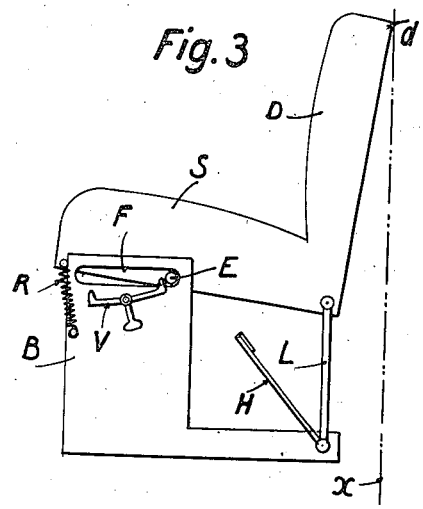
Fig. 3 is a side elevational view of a seat made according to the present invention, with the back of said seat in the vertical position.
Figure 2:
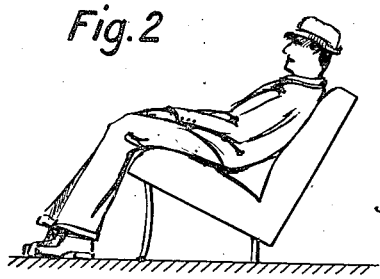

In Fig. 3, which shows the normal position, or vertical position, the seat bears upon the pedestal partly through the vertical link L, which acts as a support for said seat and partly through pins E bearing upon the pedestal at the right end of slideway F.

Figure 4:
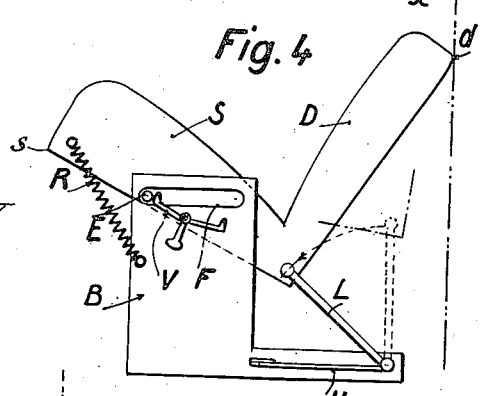
Fig. 4 is a similar view of the same seat in the inclined position thereof.

In the position of Fig. 4, which is the inclined position, the seat is connected to the pedestal through pins E, now located at the left hand end of slideway or guide F, and also through link L which keeps the seat in this inclined position. In this position, when the pin E abuts against the left end of slideway F and is held there, the under side of the seat S makes with the link L a pronounced obtuse angle and therefore the link L supports the seat also in this position because any further swinging is prevented by this obtuse angular relation of both members S and L.

It will be noted that, as the inclined position results from the pivoting of the seat about the axis of pins E combined with a simultaneous frontward rectilinear displacement of said axis, the upper edge $d$ of the back D moves down along the vertical line $x$. Similarly, the front of the seat S moves upwardly along a short path and forwardly from the position of Fig. 3 to that of Fig. 4 whereby the seat is only moderately advanced (Fig. 4), as compared with the seat position illustrated in Fig. 3, both the seat S and the back D thus remaining substantially in the same space whether they are in the vertical or in the inclined position.

In order to swing the seat from one position to the other, I may merely operate it manually by holding the top of the back and the front of the seat so as to be able to impart to the whole the combined rotary and forward or backward movement. I may also provide a special operating lever H for performing this operation.

Likewise, I may provide locking means V of any type for holding the seat. The return from the inclined position to the normal position may be carried out by means of return springs R actuated by manually starting the movement.

Figure 6:
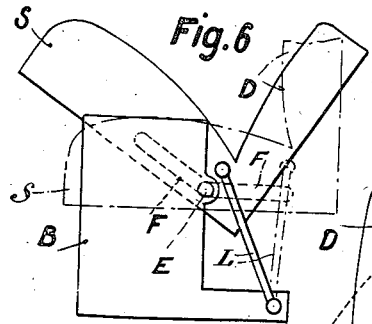
Fig. 6 is a side view of a modified form of seat.
Figure 5:
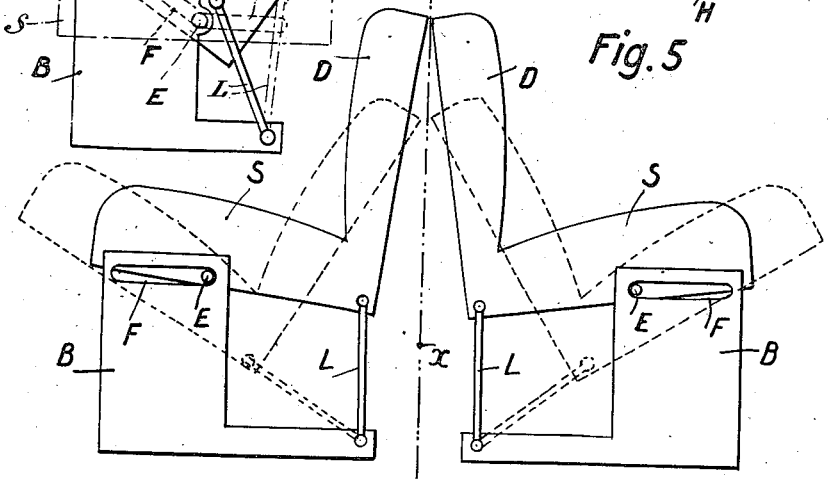
Fig. 5 shows two seats arranged in back-to-back relation, the solid lines indicating the vertical position of the seats and the dotted lines their inclined position.

In the embodiment shown in Fig. 6 the pins or transverse bars E are fixed in stationary position with respect to base or pedestal B, the slots or guides F in this instance being provided in the sides of the seat S. In the inclined position of seat S shown in Fig. 6 the pins E abut the right end of the slots or guides F to limit the forward and upward movement of the front part of seat S, the underside of seat S making an obtuse angle with link L in such manner, that the latter supports substantially the rear part of the seat in this inclined position as well as in the normal position (indicated in dot-dash lines) in which said link L is extending in upward direction. An operating lever (not shown) is preferably provided, as indicated by reference H in the case of embodiment of Fig. 3.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. A device of the character described comprising a seat, a back integral therewith and having an upper rear edge, a base including two upwardly extending spaced panels, a link pivotally connected at its lower end to said base and at its upper end to the rear part of said seat for pivotally supporting said seat in vertical and semi-recumbent positions, respectively, said base panels being each provided with a guide, and means on said seat slidable in said guide, said guide being arranged at a location on each of said base panels higher than said link connection on said base, said link, said seat means with said guide cooperating to maintain said upper rear edge of said back substantially on the same vertical line in any positions of said seat.

2. A seat according to claim 1, including an actuating lever serving for operating the seat in order to bring it from one to another of said positions, said operating lever being connected to said lower end of said link.

3. A device of the character described comprising a seat, a back integral therewith and having an upper rear edge, a base including two upwardly extending spaced apart panels, a link pivotally connected at its lower end to said base and at its upper end to the rear part of said seat for pivotally supporting said seat with its back in vertical and semi-recumbent positions, respectively, said base panels being each provided with a guide, means on said seat slidable in said guide, each guide being arranged at a location of said base panel higher than that of said link connection on said base, said link and said seat means with said guide cooperating to maintain said upper rear edge of said back substantially on the same vertical line in any positions of said seat, an actuating lever serving for operating said seat in order to bring it from one position to another of said positions, said operating lever being connected to said lower end of said link, and locking elements engageable with said seat means for maintaining said seat in any of said positions.

ANDRÉ RUEGGER.